(12) United States Patent
Madan et al.

(10) Patent No.: US 8,559,993 B2
(45) Date of Patent: Oct. 15, 2013

(54) METHOD FOR MANAGING SUB-BAND PREFERENCE ORDER IN A WIRELESS COMMUNICATION SYSTEM

(75) Inventors: Ritesh K. Madan, Jersey City, NJ (US); Ashwin Sampath, Skillman, NJ (US)

(73) Assignee: QUALCOMM Incorporated

( * ) Notice: Subject to any disclaimer, the term of this patent is extended or adjusted under 35 U.S.C. 154(b) by 495 days.

(21) Appl. No.: 12/698,354

(22) Filed: Feb. 2, 2010

(65) Prior Publication Data

US 2010/0203913 A1    Aug. 12, 2010

Related U.S. Application Data

(60) Provisional application No. 61/149,604, filed on Feb. 3, 2009, provisional application No. 61/180,701, filed on May 22, 2009.

(51) Int. Cl.
*H04W 72/04* (2009.01)
*H04B 7/00* (2006.01)

(52) U.S. Cl.
USPC .............. 455/509; 455/452.2; 455/67.13; 455/453

(58) Field of Classification Search
USPC .......... 455/450, 452.1, 453, 509, 452.2, 63.1, 455/446, 447, 63.4, 67.11, 67.13, 501; 370/338, 329
See application file for complete search history.

(56) References Cited

U.S. PATENT DOCUMENTS

| 7,808,922 B2 * | 10/2010 | Dekorsy ................ 370/252 |
| 2002/0102981 A1 | 8/2002 | Jechoux |
| 2003/0166404 A1 * | 9/2003 | Chuang et al. ............. 455/453 |
| 2008/0233967 A1 * | 9/2008 | Montojo et al. .......... 455/452.2 |
| 2011/0134853 A1 | 6/2011 | Zhu et al. |

FOREIGN PATENT DOCUMENTS

| JP | 2002315049 A | 10/2002 |
| WO | WO2008118810 | 10/2008 |
| WO | 2009021348 A1 | 2/2009 |

OTHER PUBLICATIONS

International Search Report and Written Opinion—PCT/US2010/023103, International Search Authority—European Patent Office—Dec. 6, 2010.
Taiwan Search Report—TW099103208—TIPO—Jan. 28, 2013.

* cited by examiner

*Primary Examiner* — John J Lee
(74) *Attorney, Agent, or Firm* — Nerrie M. Zohn

(57) ABSTRACT

Techniques for allocating resources in a wireless communications network are provided. According to certain aspects, a scheme is provided, wherein resources of sub-bands associated with non-interfering links are allocated before resources of sub-bands associated with interfering links.

22 Claims, 7 Drawing Sheets

METHOD FOR MANAGING SUB-BAND PREFERENCE ORDER IN A WIRELESS COMMUNICATION SYSTEM

CLAIM OF PRIORITY UNDER 35 U.S.C. §119

The present application for patent claims benefit of U.S. Provisional Patent Application Ser. No. 61/149,604, entitled, "Apparatus and Method for Handling Sub-band Preference Order in a Wireless Communication System," filed Feb. 3, 2009; and U.S. Provisional Patent Application Ser. No. 61/180,701, entitled, "Systems and Methods of Soft Coloring and Managing Corresponding Sub-band Preference Order in a Wireless Communication System," filed May 22, 2009; and are assigned to the assignee hereof and hereby expressly incorporated by reference herein.

BACKGROUND

1. Field

Certain aspects of the present disclosure relate to wireless communications and, more particularly, to management of wireless connections.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels. Each of the NS independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

Certain aspects of the present disclosure provide a method for allocating resources in a wireless communications system. The method generally includes classifying at least a second link as a dominant interfering link based on a determination of at least one of: transmissions on a first link at least potentially interfere with transmissions on the second link or transmissions on the second link at least potentially interfere with transmissions on the first link, receiving, via a backhaul connection, load information regarding resource needs of at least the first link, and, based on the load information, allocating resources of a first sub-band for transmissions on the first link and, after exhausting resources of the first sub-band, allocating resources of a second sub-band associated with the second link.

Certain aspects of the present disclosure provide an apparatus for allocating resources in a wireless communications system. The apparatus generally includes logic for classifying at least a second link as a dominant interfering link based on a determination of at least one of: transmissions on a first link at least potentially interfere with transmissions on the second link or transmissions on the second link at least potentially interfere with transmissions on the first link, logic for receiving, via a backhaul connection, load information regarding resource needs of at least the first link, and logic for, based on the load information, allocating resources of a first sub-band for transmissions on the first link and, after exhausting resources of the first sub-band, logic for allocating resources of a second sub-band associated with the second link.

Certain aspects of the present disclosure provide an apparatus for allocating resources in a wireless communications system. The apparatus generally includes means for classifying at least a second link as a dominant interfering link based on a determination of at least one of: transmissions on a first link at least potentially interfere with transmissions on the second link or transmissions on the second link at least potentially interfere with transmissions on the first link, means for receiving, via a backhaul connection, load information regarding resource needs of at least the first link, and means for, based on the load information, allocating resources of a first sub-band for transmissions on the first link and, after exhausting resources of the first sub-band, means for allocating resources of a second sub-band associated with the second link.

Certain aspects of the present disclosure provide a computer-program product for allocating resources in a wireless communications system, comprising a computer readable medium having instructions stored thereon, the instructions being executable by one or more processors. The instructions generally include instructions for classifying at least a second link as a dominant interfering link based on a determination of at least one of: transmissions on a first link at least potentially interfere with transmissions on the second link or transmissions on the second link at least potentially interfere with transmissions on the first link, instructions for receiving, via a backhaul connection, load information regarding resource needs of at least the first link, and instructions for allocating, based on the load information, resources of a first sub-band for transmissions on the first link and, after exhausting resources of the first sub-band, instructions for allocating resources of a second sub-band associated with the second link.

Certain aspects of the present disclosure provide an apparatus for allocating resources in a wireless communications system. The apparatus generally includes at least one processor configured to classify at least a second link as a dominant interfering link based on a determination of at least one of: transmissions on a first link at least potentially interfere with transmissions on the second link or transmissions on the second link at least potentially interfere with transmissions on the first link, receive, via a backhaul connection, load information regarding resource needs of at least the first link, and, based on the load information, allocate resources of a first sub-band for transmissions on the first link and, after exhausting resources of the first sub-band, allocate resources of a second sub-band associated with the second link.

DETAILED DESCRIPTION

Certain techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
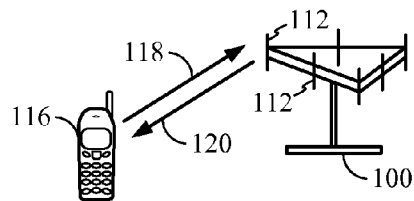
FIG. 1 illustrates an example wireless communication system.

Referring to FIG. 1, a multiple access wireless communication system according to one embodiment is illustrated. An access point 100 (AP) may include multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 transmit information to access terminal 116 over forward link 120 and receive information from access terminal 116 over reverse link 118. In a FDD system, communication links may use different frequency for communication. For example, forward link 120 may use a different frequency then that used by reverse link 118.

An access point may be a fixed station used for communicating with the terminals and may also be referred to as an access point, a Node B, an evolved Node B (eNode B), or some other terminology. An access terminal may also be called an access terminal, user equipment (UE), a wireless communication device, terminal, access terminal or some other terminology.

Figure 2:
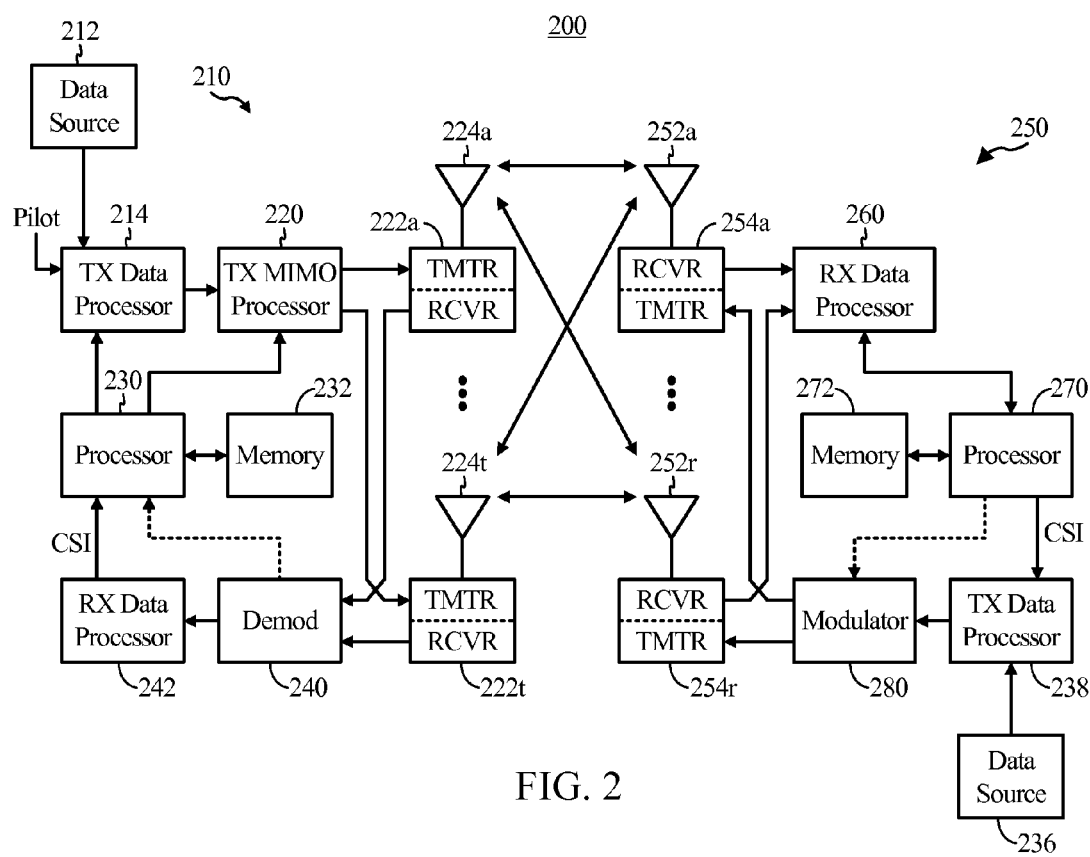
FIG. 2 illustrates a block diagram of an example access point and user terminal.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprise Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH) and a plurality of PHY channels. The PHY channels comprise a set of DL channels and UL channels.

The DL PHY channels may comprise, for example, a Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), and a Paging Indicator Channel (PICH), Load Indicator Channel (LICH).

The UL PHY Channels may comprise, for example, a Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

Figure 3:
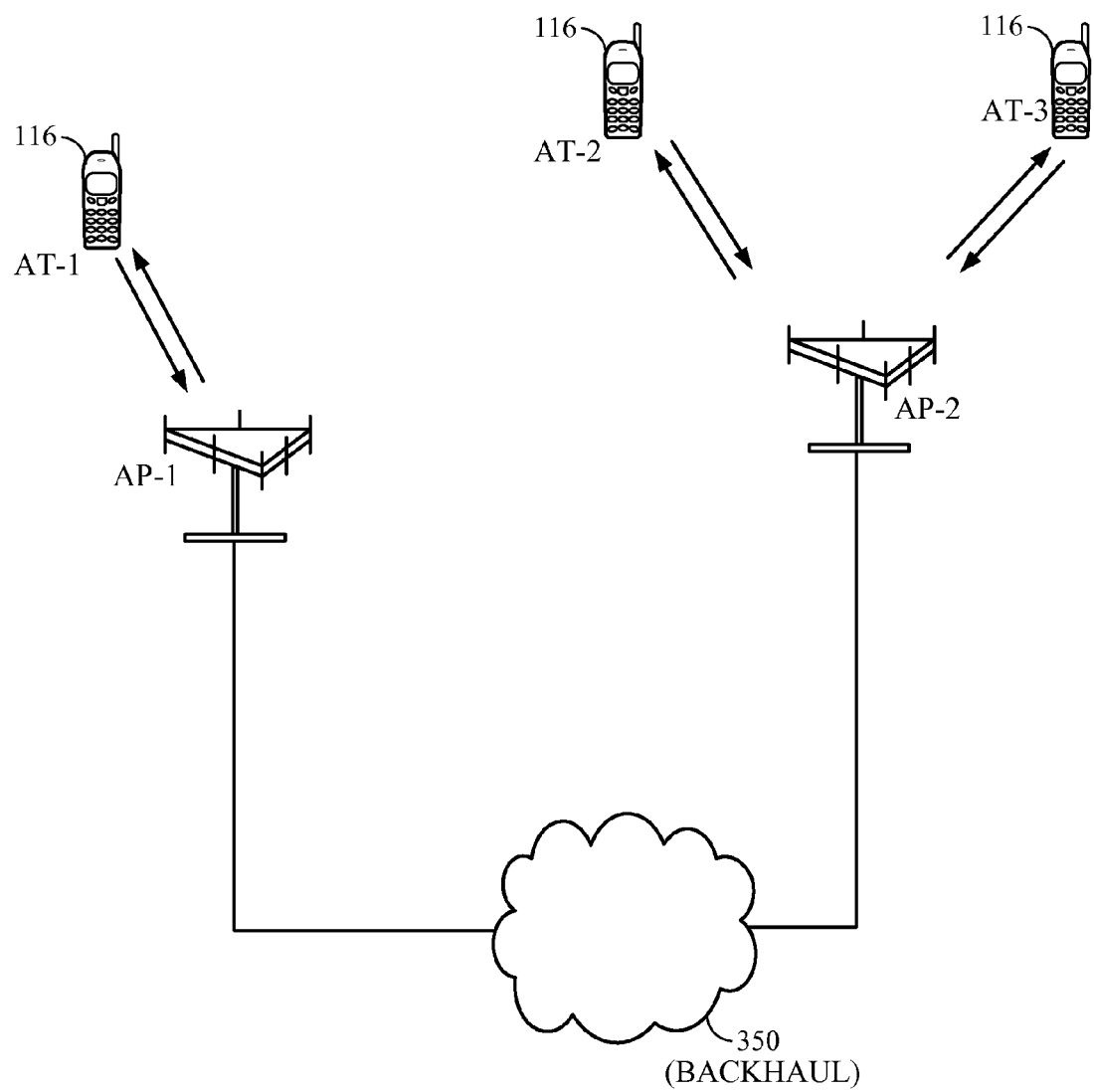
FIG. 3 illustrates an example wireless communication system having multiple access points.

Method for Managing Sub-Band Preference Order in a Wireless Communication System FIG. 3 illustrates an example multiple access wireless communication system with multiple access points 100, AP-1 and AP-2. In the illustrated example, AP-1 serves a single access terminal (AT-1), while AP-2 serves two ATs, AT-2 and AT-3. According to certain aspects, one or more of the APs may be Femtocell or picocell base stations, for example, established to provide service in an area that is not covered by traditional cellular service.

Such deployments may be relatively unplanned and lack the defined geometry of traditional cellular base station deployments. As a result, a transmission from AP-1 may interfere with a transmission from AP-2. In an effort to reduce interference, AP-1 and AP-2 may coordinate communications and resource allocation.

According to certain aspects of the present disclosure, each AP may periodically exchange resource negotiations messages 310 over a backhaul link 350. These messages may contain various types of information to help schedule and/or prioritize transmissions, such as information about channel conditions, interference at the receiver, and QoS parameters of traffic flows.

An AP may utilize information received in such messages to decide, in a decentralized manner, the resources over which it should send/receive data in a manner that reduces interference with transmissions from other APs. In order to avoid interference, transmission frequencies and transmit power may be made with fairness in mind, while still attempting to satisfy QoS requirements.

Because the backhaul connection 350 is typically capable of high data throughput and is generally not bandwidth-limited, a relatively large amount of information may be exchanged in resource negotiation messages, which may help allow for intelligent decisions regarding resource allocation. For example, according to certain embodiments, a backhaul connection 350 may be a wired Internet Protocol (IP) connection.

Certain wireless communications systems, such as many 4G deployments, are unplanned and feature Femto and Pico base stations for enhanced coverage of remote and/or sparsely populated areas. Such deployments may be relatively unplanned and lack the defined geometry of cellular base station distribution.

As a result, a transmission from AP-1 may interfere with a transmission from AP-2. In an effort to reduce interference, AP-1 and AP-2 may coordinate communications and resource allocation. Also, only a few mobiles will typically be associated with each base station. Hence, due to a lack of statistical multiplexing between multiple traffic sources in a cell, static allocation of resources is typically not an optimal strategy.

In the absence of relatively fast time-scale coordination between multiple sources, there may be a substantial amount of interference between transmissions on links which interfere with each other, so called "dominant interferers." Thus, it may be desirable to coordinate resource allocation for multiple sources in an effort to mitigate this interference, at least on an average.

In conventional systems, random hopping or random reuse has been used in an effort to average the interference from the dominant interferers to a given receiver. However, such techniques have the disadvantage that there is a finite (and sometimes high enough) probability that a dominant interferer will transmit on the same frequency band used for transmission by another source with which it interferes. For example, consider two links which interfere highly with each other. If each link needs only half the bandwidth to transmit its entire buffer, random reuse will still lead to a scheme where the two links interfere with a probability of 0.5 (irrespective of resource granularity). Certain aspects of the present disclosure, however, may help reduce this probability of interference.

According to certain aspects of the present disclosure, APs may adopt a hybrid technique for allocating spectral resources. This technique may utilize relatively slow time-scale coordination in an effort to avoid interference from dominant interferers when the network is lightly loaded. When the network is more heavily loaded, and each transmitter has a high number of bits to transmit some degree of interference may be difficult to avoid. In such cases, the technique may operate in an effort to mitigate the effects of interference, for example, by utilizing random reuse in an effort to average interference.

As will be described herein, the technique may involve assigning resources in a manner that attempts to avoid interference when possible. Addition resources, if needed, may then be assigned in a manner that mitigates interference. In other words, the total bandwidth available in a wireless system may be divided into sub-bands such that the interference between transmissions using spectral resources on certain (e.g., non-adjacent) sub-bands is typically low. When a system is loaded sufficiently, however, even "dominant interfering" sub-bands may be allocated when non-interfering sub-bands have been exhausted and additional resources are needed.

Figure 4:
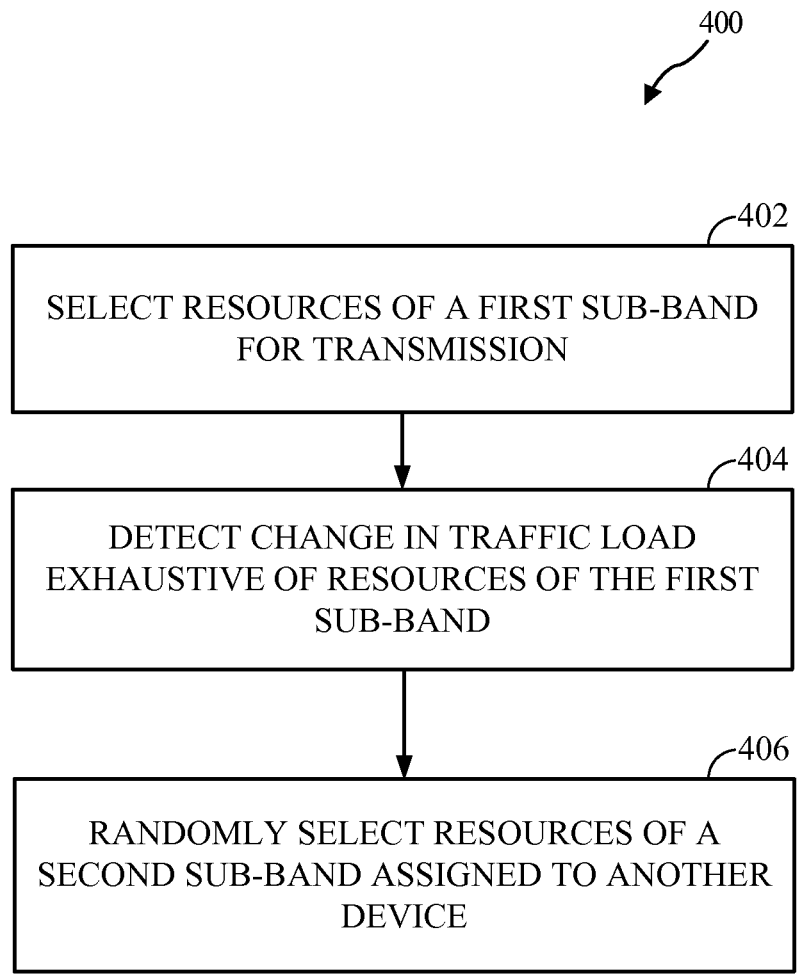
FIGS. 4 and 5 illustrate example operations that may be performed for resource allocation in accordance with certain aspects of the present disclosure.

FIG. 4 illustrates example operations 400 that may be performed by an AP to allocate resources according to certain aspects. The operations begin, at 402, by selecting resources of a first sub-band for transmission. To make this selection, an AP may use slow time-scale information received from other APs via a backhaul connection, as described above.

At 404, a change in traffic load that results in the exhaustion of resources of the first sub-band is detected. For example, an AP may be transmitting data of an amount that utilizes all or substantially all of the resources of the first sub-band.

At 406, resources of a second sub-band are randomly selected. The second sub-band may be a dominant interferer and/or may be already assigned to another device. However, by randomly assigning resources thereof, interference may be averaged.

Figure 5:
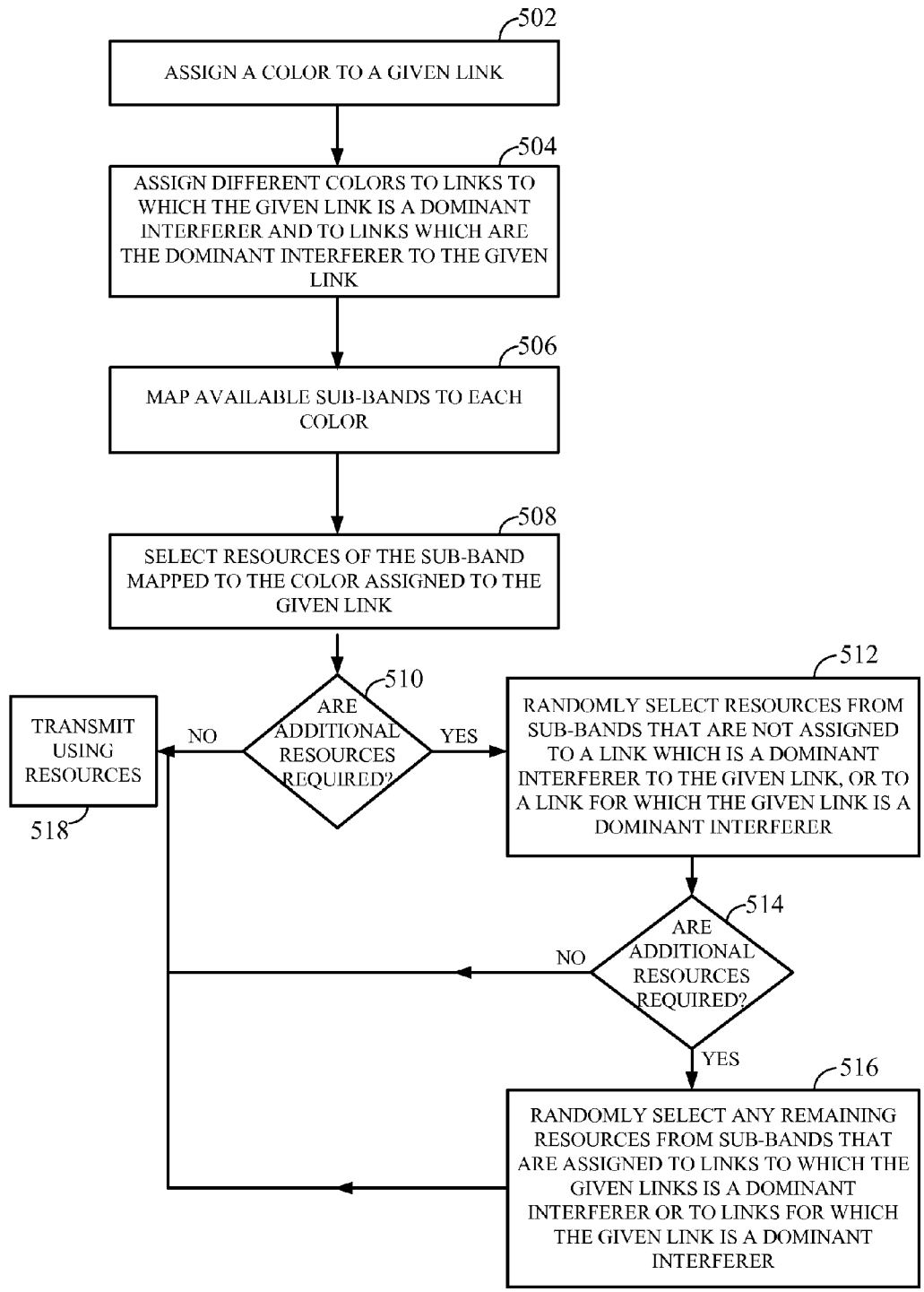

FIG. 5 illustrates example operations 500, according to one embodiment, for allocating resources using a classification (or "coloring") scheme to mitigate interference between APs. The operations 500 may be considered a specific embodiment of the hybrid technique described with reference to FIG. 4.

The operations 500 may be performed, separately, by each AP in a wireless network. The term "color" is used merely to refer to the different classification of given communications links. Thus, "assigning a color" to a given link is merely a mechanism to identify that link (by its color) and any other suitable classification mechanism may also be used.

An AP may identify one or more "dominant transmitters," which generally refer to an AP whose transmissions may cause substantial interference with its own transmissions. At 502, the AP may assign a color to a given link, between a transmitter and a receiver, according to a coloring scheme, an example of which is described in greater detail below. According to such a scheme, all links to which the given link is the dominant interferer and all links that are dominant interferers to the given link may be assigned a different color, at 504.

At 506, each color is mapped to a sub-band. According to certain aspects, fast distributed randomized algorithms may compute such a coloring scheme efficiently and with little coordination. The use of the color assignment constraints may be limited, for example, such that the total number of constraints and/or conflicts at the given link is no more than half the total number of colors available.

In order to allocate resources for a given transaction on the given link, selection may begin based on the coloring scheme. For example, at 508, resources of the sub-band mapped to the color assigned to the given link are selected. If these resources are sufficient, as determined at 510, no more selection may be required and transmissions may occur, at 518, using the selected resources. Transmissions may continue using these resources, if sufficient.

On the other hand, if additional resources are required, at 512 resources may be randomly selected, beginning with sub-bands that are not assigned to a link that is a dominant interferer to the given link or to a link for which the given link is a dominant interferer. If additional resources are still required, as determined at 514, resources may be selected from sub-bands that are assigned to a link that is a dominant interferer to the given link or to link for which the given link is a dominant interferer, at 516.

The hybrid approach described above may allow for interference to be avoided, when possible, by giving preference to allocating resources for transmissions on non-dominant interfering sub-bands. If resources of non-dominant interfering sub-bands are exhausted, resources of dominant interfering sub-bands may be allocated, but in a random manner, which may help averages interference.

Figure 6:
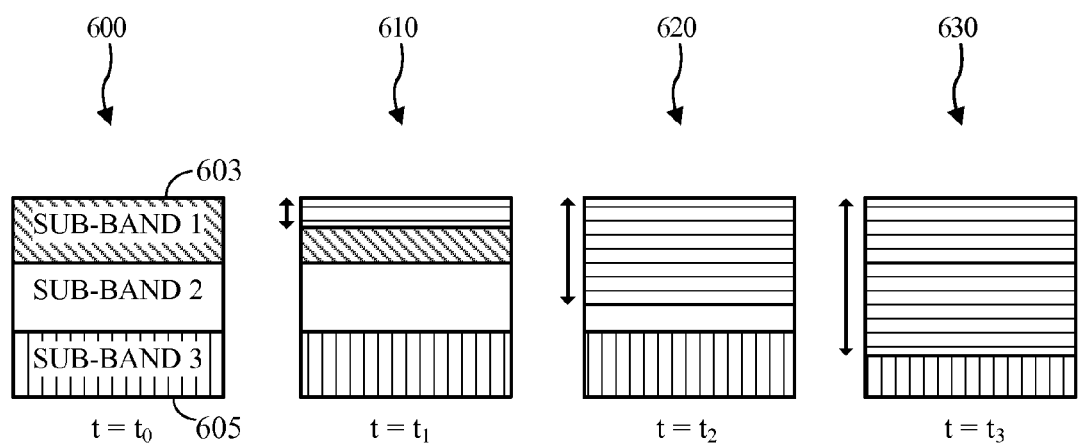
FIG. 6 illustrates an example operation in accordance with certain aspects of the present disclosure.

FIG. 6 provides a graphical illustration of a hybrid allocation scheme, in accordance with certain aspects of the present disclosure. The illustrated example assumes that available bandwidth is divided into three Sub-bands (1, 2 and 3) mapped to different links (between a transmitter and receiver).

The allocation of resources to the first link (mapped to sub-band 1) for different "frames" are shown. A frame may be considered a defined structure of spectral resources over a corresponding time period. Sub-band 3 may be mapped to a different link. Another link (link 3) may be mapped to sub-band 3. Because the two links are associated with separate sub-bands, little interference results for each others' transmission. The different frames show different resources allocated to a hypothetical link, with the resources allocated in any given frame indicated by horizontal cross-hatching.

At frame 600, in an initial state ($t=t_0$), Sub-bands 1 and 3 are mapped with different colors 603, 605 indicated with different cross-hatching. As noted above, these sub-bands are assigned to links 1 and 3, respectively. Sub-band 2 is illustrated as "uncolored" because it is neither associated with a given link, nor associated with links to which the given link is a dominant interferer, nor associated with links which are the dominant interferer to the given link.

At frame 610 (t=t$_1$), resources from sub-band 1 only are sufficient for the current demands of link 1. Thus the illustrated resource allocation is from sub-band 1 only.

At frame 620 (t=t$_2$), the current demand of link 1 is increased. After exhausting all spectral resources of sub-band 1, additional resources are allocated, beginning with unassigned sub-band 2. In one embodiment, there may be more than one unassigned sub-bands. The AP may select from among the unassigned sub-bands, randomly or through a coordinated approach using slow time-scale coordination with other APs.

At frame 630 (t=t$_3$), the current demand of link 1 is increased still further. Having exhausted the resources of the sub-band assigned to link 1 (sub-band 1) and the resources of the sub-band assigned to a non-dominant interfering link (sub-band 2), resources are selected (e.g., randomly) from sub-band 3, even though this sub-band is associated with a dominant interferer.

While concurrent use of resources in sub-band 3 by multiple sources may lead to interference, if one of the sources has only a few bits to send on a corresponding link, the interference may be relatively low. Thus, the hybrid technique presented herein may lead to favorable results, even in situations where multiple sources share resources from the same sub-band.

According to certain aspects, slow time-scale coordination (e.g., via the exchange of resource negotiation messages over a backhaul link) may be used to communicate which of the dominant interferers have the least bits to send. In the event resources of a sub-band already assigned to a dominant interferer are to be allocated, sub-bands assigned to dominant interferers with relatively fewer bits to send than other dominant interferers may be selected. Thus, even with the hybrid allocation scheme presented herein, slow time scale information may be utilized in an effort to reduce network interference when compared to a scheme in which no slow time-scale coordination had been conducted.

Figure 4A:
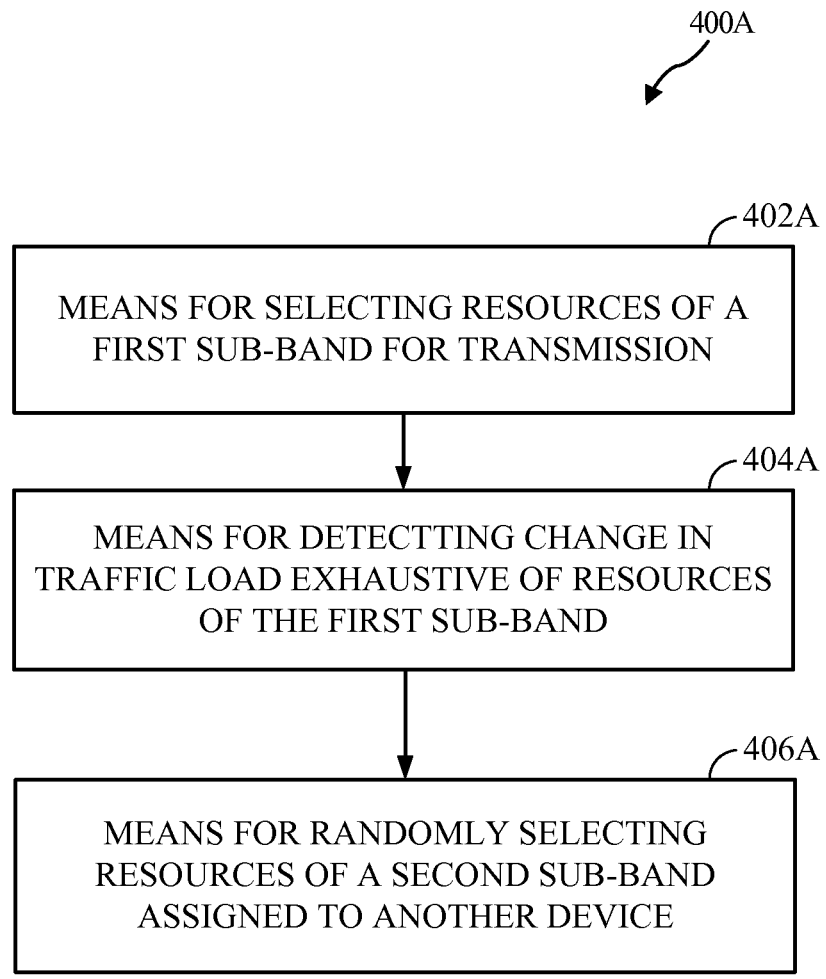
FIGS. 4A and 5A illustrate example components that may perform resource allocation in accordance with certain aspects of the present disclosure.
Figure 5A:
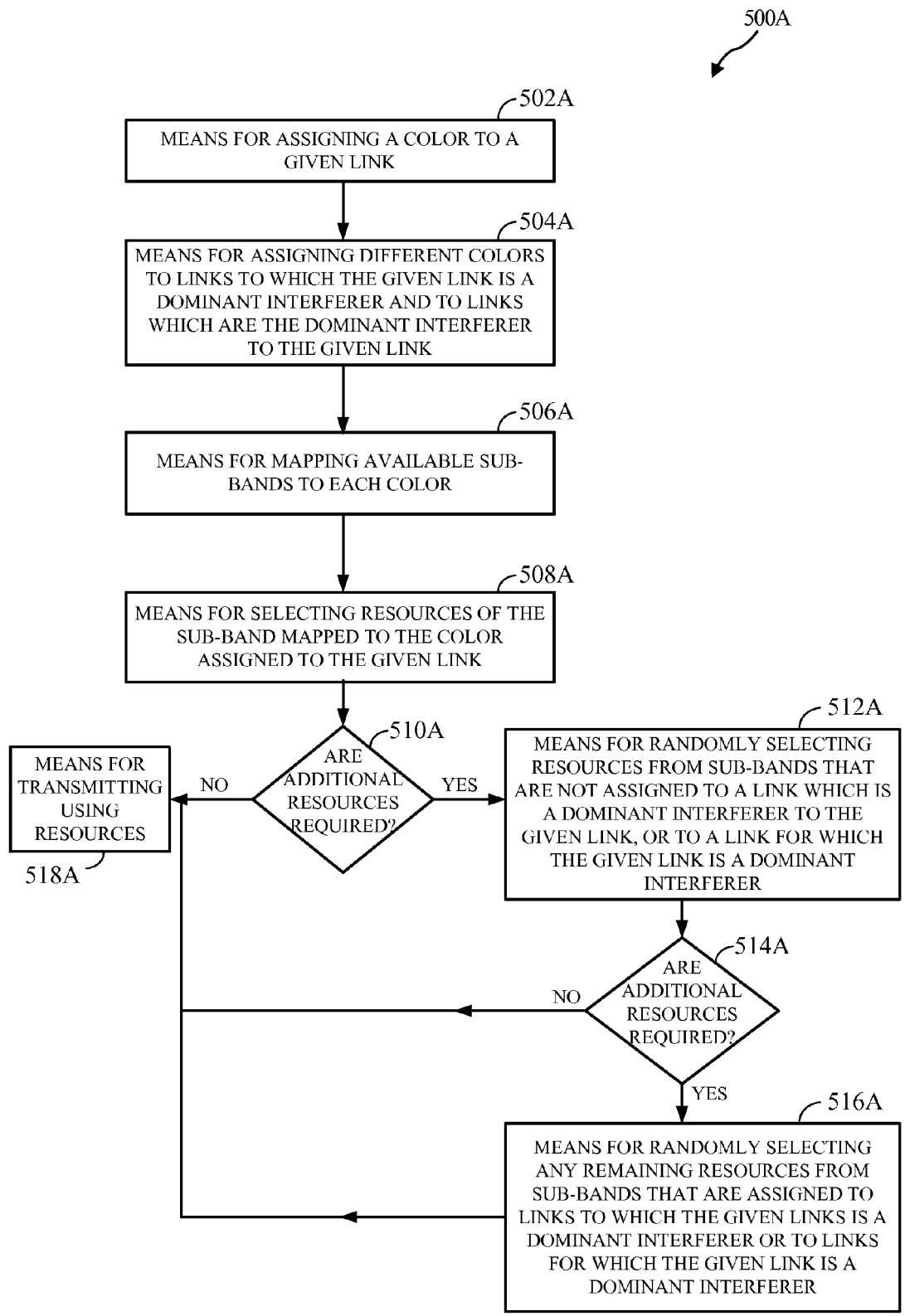

The various operations of methods described above may be performed by various hardware and/or software component(s) and/or module(s) corresponding to means-plus-function blocks illustrated in the Figures. For example, blocks 400 and 500 illustrated in FIGS. 4 and 5 correspond to means-plus-function blocks 400A and 500A illustrated in FIGS. 4A and 5A.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

The invention claimed is:

1. A method for allocating resources in a wireless communications system, comprising:
classifying at least a second link as a dominant interfering link based on a determination that at least one of:
transmissions on a first link at least potentially interfere with transmissions on the second link; or
transmissions on the second link at least potentially interfere with transmissions on the first link;
receiving, via a backhaul connection, load information regarding resource needs of at least the first link; and
based on the load information, allocating resources of a first sub-band for transmissions on the first link and, after exhausting resources of the first sub-band, allocating resources of a second sub-band associated with the second link, wherein allocating resources of the second sub-band comprises allocating resources of the second sub-band in a random manner.

2. A method for allocating resources in a wireless communications system, comprising:
classifying at least a second link as a dominant interfering link based on a determination that at least one of:
transmissions on a first link at least potentially interfere with transmissions on the second link; or
transmissions on the second link at least potentially interfere with transmissions on the first link;
receiving, via a backhaul connection, load information regarding resource needs of at least the first link; and
based on the load information, allocating resources of a first sub-band for transmissions on the first link and, after exhausting resources of the first sub-band, allocating resources of a second sub-band associated with the second link,
wherein:
the load information comprises load information regarding resource needs of at least the first link, the second link, and a third link; and
the allocating resources of a second sub-band comprises deciding to allocate resources of the second sub-band associated with the second link after determining the second link is less loaded than the third link.

3. A method for allocating resources in a wireless communications system, comprising:
classifying at least a second link as a dominant interfering link based on a determination that at least one of:
transmissions on a first link at least potentially interfere with transmissions on the second link; or
transmissions on the second link at least potentially interfere with transmissions on the first link;
classifying at least a third link as non-dominant interfering link based on at least one of:
transmissions on the first link are determined to not substantially interfere with transmissions on the third link; or
transmissions on the third link are determined to not substantially interfere with transmissions on the first link;
receiving, via a backhaul connection, load information regarding resource needs of at least the first link; and
based on the load information, allocating resources of a first sub-band for transmissions on the first link andallocating resources of a second sub-band associated with the second link,
the allocating resources of the second sub-band occurring after exhausting resources of the first sub-band and the allocating resources of a second sub-band including, allocating resources of a third sub-band associated with the third link for transmissions on the first link, after exhausting resources of the first sub-band and prior to allocating resources of the second sub-band.

4. The method of claim 3, wherein allocating resources of a second sub-band comprises randomly allocating resources of the third sub-band after exhausting resources of the first and second sub-bands.

5. A method for allocating resources in a wireless communications system, comprising:
classifying at least a second link as a dominant interfering link based on a determination that at least one of:
transmissions on a first link at least potentially interfere with transmissions on the second link; or
transmissions on the second link at least potentially interfere with transmissions on the first link;
receiving, via a backhaul connection, load information regarding resource needs of at least the first link; and
based on the load information, allocating resources of a first sub-band for transmissions on the first link and, after exhausting resources of the first sub-band, allocating resources of a second sub-band associated with the second link,
wherein:
the first and second sub-bands are associated with the first and second links by applying a node coloring algorithm for a graph, and wherein:
each link corresponds to a node,
first and second nodes are connected by an edge if either a first node represents a link which is a dominant interferer for the link represented by a second node, or the second node represents a link which is a dominant interferer for the link represented by the first node, and
the node coloring algorithm colors nodes such that any two nodes connected by an edge have different colors; and
each color is mapped to a sub-band.

6. The method of claim 5, wherein average load information is taken into account to allocate more than one color to links with higher loads.

7. An apparatus for allocating resources in a wireless communications system, comprising at least one processor configured to:
at least a second link as a dominant interfering link based on a determination that at least one of:
transmissions on a first link at least potentially interfere with transmissions on the second link; or
transmissions on the second link at least potentially interfere with transmissions on the first link;
receive, via a backhaul connection, load information regarding resource needs of at least the first link;
based on the load information, allocate resources of a first sub-band for transmissions on the first link; and
allocate resources of a second sub-band associated with the second link after exhausting resources of the first sub-band, wherein the allocating resources of the second sub-band includes allocating resources of the second sub-band in a random manner.

8. An apparatus for allocating resources in a wireless communications system, comprising at least one processor configured to:
at least a second link as a dominant interfering link based on a determination that at least one of:
transmissions on a first link at least potentially interfere with transmissions on the second link; or
transmissions on the second link at least potentially interfere with transmissions on the first link;

receive, via a backhaul connection, load information regarding resource needs of at least the first link, the load information comprises load information regarding resource needs of at least the first link, the second link, and a third link;

based on the load information, allocate resources of a first sub-band for transmissions on the first link; and allocate resources of a second sub-band associated with the second link after exhausting resources of the first sub-band, the allocating resources of a second sub-band includes allocating resources of the second sub-band associated with the second link after determining the second link is less loaded than the third link.

9. An apparatus for allocating resources in a wireless communications system, comprising at least one processor configured to:

classify at least a second link as a dominant interfering link based on a determination that at least one of:
- transmissions on a first link at least potentially interfere with transmissions on the second link; or
- transmissions on the second link at least potentially interfere with transmissions on the first link;

classify at least a third link as non-dominant interfering link based on at least one of:
- transmissions on the first link are determined to not substantially interfere with transmissions on the third link; or
- transmissions on the third link are determined to not substantially interfere with transmissions on the first link;

receive, via a backhaul connection, load information regarding resource needs of at least the first link;

based on the load information, allocate resources of a first sub-band for transmissions on the first link; and allocate resources of a second sub-band associated with the second link after exhausting resources of the first sub-band, wherein allocating resources of the second sub-band includes allocating resources of a third sub-band associated with the third link for transmissions on the first link, after exhausting resources of the first sub-band and prior to allocating resources for the second sub-band.

10. The apparatus of claim 9, wherein the allocating resources of the second sub-band includes randomly allocating resources of the third sub-band after exhausting resources of the first and second sub-bands.

11. An apparatus for allocating resources in a wireless communications system, comprising at least one processor configured to:

classify at least a second link as a dominant interfering link based on a determination that at least one of:
- transmissions on a first link at least potentially interfere with transmissions on the second link; or
- transmissions on the second link at least potentially interfere with transmissions on the first link;

receive, via a backhaul connection, load information regarding resource needs of at least the first link;

based on the load information, allocate resources of a first sub-band for transmissions on the first link; and allocate resources of a second sub-band associated with the second link after exhausting resources of the first sub-band, wherein:
the first and second sub-bands are associated with the first and second links by applying a node coloring algorithm for a graph wherein:
each link corresponds to a node,
a first and a second node are connected by an edge if either the first node represents a link which is a dominant interferer for a link corresponding to the second node, or the second node represents a link which is a dominant interferer for a link to the first node, and
the node coloring algorithm colors nodes such that any two nodes connected by an edge have different colors; and
each color is mapped to a sub-band.

12. The apparatus of claim 11, wherein average load information is taken into account to allocate more than one color to links with higher loads.

13. An apparatus for allocating resources in a wireless communications system, comprising:

means for classifying at least a second link as a dominant interfering link based on a determination that at least one of:
- transmissions on a first link at least potentially interfere with transmissions on the second link; or
- transmissions on the second link at least potentially interfere with transmissions on the first link;

means for receiving, via a backhaul connection, load information regarding resource needs of at least the first link; and means for, based on the load information, allocating resources of a first sub-band for transmissions on the first link; and means for allocating resources of a second sub-band associated with the second link after exhausting resources of the first sub-band, wherein allocating resources of the second sub- band comprises allocating resources of the second sub-band in a random manner.

14. An apparatus for allocating resources in a wireless communications system, comprising:

means for classifying at least a second link as a dominant interfering link based on a determination that at least one of:
- transmissions on a first link at least potentially interfere with transmissions on the second link; or
- transmissions on the second link at least potentially interfere with transmissions on the first link;

means for receiving, via a backhaul connection, load information regarding resource needs of the first link, the load information comprises load information regarding resource needs of at least the first link, the second link, and a third link;

means for, based on the load information, allocating resources of a first sub-band for transmissions on the first link; and means for allocating resources of a second sub-band associated with the second link after exhausting resources of the first sub-band, wherein the means for allocating resources of a second sub-band allocates resources of the second sub-band associated with the second link after determining the second link is less loaded than the third link.

15. An apparatus for allocating resources in a wireless communications system, comprising:

means for classifying at least a second link as a dominant interfering link based on a determination that at least one of:
- transmissions on a first link at least potentially interfere with transmissions on the second link; or
- transmissions on the second link at least potentially interfere with transmissions on the first link;

means for classifying a third link as non-dominant interfering link based on at least one of:
  transmissions on the first link are determined to not substantially interfere with transmissions on the third link; or
  transmissions on the third link are determined to not substantially interfere with transmissions on the first link;
means for receiving, via a backhaul connection, load information regarding resource needs of the first link;
means for, based on the load information, allocating resources of a first sub-band for transmissions on the first link; and
means for allocating resources of a second sub-band associated with the second link after exhausting resources of the first sub-band,
wherein the means for allocating resources of a second sub-band allocates resources of a third sub-band associated with the third link for transmissions on the first link, after exhausting resources of the first sub-band and prior to allocating resources of the second sub- band.

16. The apparatus of claim 15, further comprising means for randomly allocating resources of the third sub-band after exhausting resources of the first and second sub-bands.

17. An apparatus for allocating resources in a wireless communications system, comprising:
  means for classifying at least a second link as a dominant interfering link based on a determination that at least one of:
    transmissions on a first link at least potentially interfere with transmissions on the second link; or
    transmissions on the second link at least potentially interfere with transmissions on the first link;
  means for receiving, via a backhaul connection, load information regarding resource needs of the first link;
  means for, based on the load information, allocating resources of a first sub-band for transmissions on the first link; and
  allocating resources of a second sub-band associated with the second link after exhausting resources of the first sub-band, wherein the means for allocating resources allocates resources of the second sub-band associated with the second link,
  wherein the means for allocating resources of a second sub-band associates the first and second sub-bands with the first and second links by applying a node coloring algorithm for a graph, wherein:
    each link corresponds to a node,
    a first and a second node are connected by an edge if either the first node to a link which is a dominant interferer for the link corresponding to the second node, or the second node corresponds to a link which is a dominant interferer for a link corresponding to the first node,
    the node coloring algorithm colors nodes such that any two nodes connected by an edge have different colors; and
    each color is mapped to a sub-band.

18. The apparatus of claim 17, wherein average load information is taken into account to allocate more than one color to links with higher loads.

19. A computer-program product for allocating resources in a wireless communications system, comprising a non-transitory computer readable medium having instructions stored thereon, the instructions being executable by one or more processors and the instructions comprising:
  instructions for classifying at least a second link as a dominant interfering link based on a determination that at least one of:
    transmissions on a first link at least potentially interfere with transmissions on the second link or
    transmissions on the second link at least potentially interfere with transmissions on the first link;
  instructions for receiving, via a backhaul connection, load information regarding resource needs of at least the first link;
  instructions for allocating, based on the load information, resources of a first sub-band for transmissions on the first link; and
  instructions for allocating resources of a second sub-band associated with the second link after exhausting resources of the first sub-band, wherein allocating resources of the second sub-band comprises allocating resources of the second sub-band in a random manner.

20. A computer-program product for allocating resources in a wireless communications system, comprising a non-transitory computer readable medium having instructions stored thereon and being executable by one or more processors, the instructions comprising code for:
  classifying at least a second link as a dominant interfering link based on a determination that at least one of:
    transmissions on a first link at least potentially interfere with transmissions on the second link; or
    transmissions on the second link at least potentially interfere with transmissions on the first link;
  receiving, via a backhaul connection, load information regarding resource needs of at least the first link; and
  based on the load information, allocating resources of a first sub-band for transmissions on the first link and, after exhausting resources of the first sub-band, allocating resources of a second sub-band associated with the second link,
  wherein:
    the load information comprises load information regarding resource needs of at least the first link, the second link, and a third link; and
    the allocating resources of a second sub-band comprises deciding to allocate resources of the second sub-band associated with the second link after determining the second link is less loaded than the third link.

21. A computer-program product for allocating resources in a wireless communications system, comprising a non-transitory computer readable medium having instructions stored thereon and being executable by one or more processors, the instructions comprising code for:
  classifying at least a second link as a dominant interfering link based on a determination that at least one of:
    transmissions on a first link at least potentially interfere with transmissions on the second link; or
    transmissions on the second link at least potentially interfere with transmissions on the first link;
  classifying at least a third link as non-dominant interfering link based on at least one of:
    transmissions on the first link are determined to not substantially interfere with transmissions on the third link; or
    transmissions on the third link are determined to not substantially interfere with transmissions on the first link;
  receiving, via a backhaul connection, load information regarding resource needs of at least the first link; and based on the load information, allocating resources of a first sub-band for transmissions on the first link and allocating resources of a second sub-band associated with the second link, the allocating resources of the second sub-band occurring after exhausting resources of the first sub-band and the allocating resources of a second sub-band comprising, allocating resources of a third sub-band associated with the third link for transmissions on the first link, after exhausting resources of the first sub-band and prior to allocating resources of the second sub-band.

22. A computer-program product for allocating resources in a wireless communications system, comprising a non-transitory computer readable medium having instructions stored thereon and being executable by one or more processors, the instructions comprising code for:

classifying at least a second link as a dominant interfering link based on a determination that at least one of:

transmissions on a first link at least potentially interfere with transmissions on the second link; or transmissions on the second link at least potentially interfere with transmissions on the first link;

receiving, via a backhaul connection, load information regarding resource needs of at least the first link; and based on the load information, allocating resources of a first sub-band for transmissions on the first link and, after exhausting resources of the first sub-band, allocating resources of a second sub-band associated with the second link, wherein:

the first and second sub-bands are associated with the first and second link by applying a node coloring algorithm for a graph, and wherein:

each link corresponds to a node, first and second nodes are connected by an edge if either a first node represents a link which is a dominant interferer for the link represented by a second node, or the second node represents a link which is a dominant interferer for the link represented by the first node, and the node coloring algorithm colors nodes such that any two nodes connected by an edge have different colors; and each color is mapped to a sub-band.

* * * * *